(12) United States Patent
Das et al.

(10) Patent No.: US 8,958,354 B2
(45) Date of Patent: Feb. 17, 2015

(54) WIRELESS ACCESS POINT BEACON MESSAGING

(75) Inventors: Saumitra Mohan Das, San Jose, CA (US); Edward Thomas Lingham Hardie, Menlo Park, CA (US)

(73) Assignee: QUALCOMM Incorporated, San Diego, CA (US)

( * ) Notice: Subject to any disclaimer, the term of this patent is extended or adjusted under 35 U.S.C. 154(b) by 427 days.

(21) Appl. No.: 12/722,305

(22) Filed: Mar. 11, 2010

(65) Prior Publication Data

US 2010/0232337 A1  Sep. 16, 2010

Related U.S. Application Data

(60) Provisional application No. 61/160,228, filed on Mar. 13, 2009.

(51) Int. Cl.
*H04W 40/00* (2009.01)
*H04W 4/12* (2009.01)
*H04W 92/10* (2009.01)
*H04W 88/08* (2009.01)
*H04W 48/10* (2009.01)

(52) U.S. Cl.
CPC ..................................... *H04W 4/12* (2013.01)
USPC ........... 370/312; 370/331; 370/338; 370/390; 370/432; 370/474; 455/3.01; 455/422.1; 455/436

(58) Field of Classification Search
CPC . H04W 40/22; H04W 40/244; H04W 72/005; H04W 72/0433; H04W 84/12; H04W 88/04; H04W 88/12; H04W 92/10; H04L 12/189

USPC ................. 370/312, 338, 390, 432, 474, 331; 455/3.01, 67.11, 445, 517, 422.1, 436
See application file for complete search history.

(56) References Cited

U.S. PATENT DOCUMENTS

| 6,957,067 | B1 * | 10/2005 | Iyer et al. ................... 455/435.1 |
| 7,266,374 | B2 * | 9/2007 | Kim ............................. 455/439 |
| 7,339,915 | B2 * | 3/2008 | Jakkahalli et al. ............ 370/338 |
| 7,383,288 | B2 * | 6/2008 | Miloushev et al. ................... 1/1 |
| 7,417,971 | B2 * | 8/2008 | Jeong et al. .................... 370/331 |
| 7,457,620 | B2 * | 11/2008 | Lam et al. ...................... 455/434 |
| 7,525,966 | B2 * | 4/2009 | Fujinami ....................... 370/390 |

(Continued)

FOREIGN PATENT DOCUMENTS

| CN | 1264235 A | 8/2000 |
| CN | 101150701 A | 3/2008 |

(Continued)

OTHER PUBLICATIONS

"Beacon-Stuffing: Wi-Fi Without Associations" Ranveer Chandra, Jitendra Padhye, Lenin Ravindranath, Alec Wolman, Microsoft Research, pp. 1-6, Mar. 2007.

(Continued)

*Primary Examiner* — Alpus H Hsu
(74) *Attorney, Agent, or Firm* — Arnold J. Gum (57) ABSTRACT

The subject matter disclosed herein relates to wireless communication of messages between a wireless access point and one or more mobile stations. Example embodiments may comprise wireless communication of messages of variable length partitioned among one or more beacon signals transmitted from the wireless access point.

50 Claims, 7 Drawing Sheets

(56) References Cited

U.S. PATENT DOCUMENTS

| | | | |
|---|---|---|---|
| 7,561,898 B2* | 7/2009 | Seo ................................ 455/561 |
| 7,688,785 B2* | 3/2010 | Bachmann et al. ........... 370/331 |
| 7,787,401 B2* | 8/2010 | Kinder et al. ................. 370/310 |
| 7,848,746 B2* | 12/2010 | Juels ................. 455/424 |
| 7,969,950 B2* | 6/2011 | Iyer et al. ...................... 370/338 |
| 7,970,894 B1* | 6/2011 | Patwardhan ................. 709/224 |
| 7,983,220 B2* | 7/2011 | Kurita et al. ................. 370/331 |
| 8,112,074 B2* | 2/2012 | Bennett ...................... 455/422.1 |
| 8,472,463 B1* | 6/2013 | Ji et al. .......................... 370/439 |
| 8,588,191 B2* | 11/2013 | Mathur et al. ................ 370/338 |
| 2001/0055988 A1 | 12/2001 | Blake et al. |
| 2003/0163580 A1 | 8/2003 | Lee |
| 2004/0156347 A1* | 8/2004 | Kim ............................... 370/338 |
| 2005/0255847 A1* | 11/2005 | Han et al. ...................... 455/436 |
| 2006/0067290 A1* | 3/2006 | Miwa et al. ................... 370/338 |
| 2006/0223527 A1* | 10/2006 | Lee et al. ................... 455/432.2 |
| 2006/0268802 A1* | 11/2006 | Faccin ........................... 370/338 |
| 2006/0291425 A1* | 12/2006 | Park et al. ..................... 370/331 |
| 2007/0081477 A1* | 4/2007 | Jakkahalli et al. ............ 370/310 |
| 2007/0097921 A1* | 5/2007 | Choi et al. .................... 370/331 |
| 2007/0186105 A1* | 8/2007 | Bailey et al. ................. 713/168 |
| 2007/0242643 A1 | 10/2007 | Chandra et al. |
| 2008/0009307 A1* | 1/2008 | Sekhar et al. ................. 455/524 |
| 2008/0065892 A1* | 3/2008 | Bailey et al. ................. 713/171 |
| 2008/0201109 A1* | 8/2008 | Zill et al. ...................... 702/186 |
| 2008/0222300 A1* | 9/2008 | Bouazizi ....................... 709/231 |
| 2008/0250478 A1* | 10/2008 | Miller et al. ...................... 726/5 |
| 2009/0088182 A1* | 4/2009 | Piersol et al. ............... 455/456.1 |
| 2010/0030840 A1* | 2/2010 | O'Shea et al. ................ 709/201 |
| 2010/0142484 A1* | 6/2010 | Bachmann et al. ........... 370/331 |
| 2010/0150118 A1* | 6/2010 | Daum ........................... 370/338 |

FOREIGN PATENT DOCUMENTS

| | | |
|---|---|---|
| GB | 2349302 A | 10/2000 |
| JP | 2006245906 A | 9/2006 |
| JP | 2008219482 A | 9/2008 |
| WO | 2007120447 A1 | 10/2007 |

OTHER PUBLICATIONS

Taiwan Search Report—TW099107475—TIPO—Feb. 20, 2013.
International Search Report and Written Opinion—PCT/US2010/027187—ISA/EPO—Jun. 16, 2010.

* cited by examiner

WIRELESS ACCESS POINT BEACON MESSAGING

This application claims priority from U.S. Provisional Application No. 61/160,228 filed Mar. 13, 2009, entitled "Method for Beaconing Large Messages Using WiFi", assigned to the assignee hereof and expressly incorporated herein in its entirety by reference.

BACKGROUND

1. Field

The subject matter disclosed herein relates to wireless communication of messages of variable length partitioned among one or more beacon signals transmitted from a wireless access point.

2. Information

In wireless communication networks such as those compatible with or compliant to the IEEE 802.11x standards, for example, wireless access points provide pathways to wired networks for wireless terminals such as notebook computers and/or cellular telephones, for example. Wireless terminals may associate themselves with a particular access point by responding to and associating with that access point's beacon signal, which is a signal that is transmitted by the access point periodically in order to make its presence and association parameters known to wireless terminals in the access point's coverage area. Access points further may occasionally broadcast messages to wireless terminals by embedding messages within the access point's beacon signals. Such messages may be received by any wireless terminal within the access point's transmission range, whether a particular wireless terminal is associated with that particular access point or not. Such messages may carry a range of information. However, beacon signals are limited in the amount of information that may be transmitted.

SUMMARY

In an aspect, a message to be broadcast from a wireless access point may be partitioned into one or more message segments. The one or more message segments may be embedded in one or more beacon signals, and those beacon signals may be transmitted to one or more wireless terminals. The one or more beacon signals individually comprise at least one of the message segments, and the message segments may individually comprise prefix metadata to enable regeneration of the message including information indicating that the one or more beacon signals are not purposed for network association.

BRIEF DESCRIPTION OF THE FIGURES

Non-limiting and non-exhaustive examples will be described with reference to the following figures, wherein like reference numerals refer to like parts throughout the various figures.

DETAILED DESCRIPTION

Reference throughout this specification to "one example", "one feature", "an example" or "a feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

As discussed above, wireless access points may at times broadcast messages to wireless terminals by embedding such messages within beacon signals transmitted by the access points. The messages may be received by wireless terminals within the access point's transmission range and may carry a range of information for a number of various applications. However, beacon signals are limited in the amount of information that may be transmitted.

In an aspect, in order to overcome the limitations on the length of messages that may be delivered to wireless terminals by an access point, a given message of an arbitrary length may be partitioned into one or more segments, wherein the number of segments is determined according to the length of the message. A longer message may be partitioned into more segments than a shorter message. The various message segments may be transmitted one at a time, in an example implementation, to wireless terminals within range of the access point using beacon signals. The data delivered by way of the beacon signals may comprise metadata describing one or more attributes of the message segments and the message segments themselves. Such metadata may comprise, for example, information indicating a sequence in which the segments may be assembled by a receiving wireless terminal to reconstruct the original, full-size, non-segmented message. Various example implementations and techniques for transmitting variable and/or arbitrary length messages using beacon signals are described in the following discussion. It should be noted that although various examples disclosed herein are described as being implemented in networking environments compatible with one or more IEEE 802.11x standards, the scope of claimed subject matter is not limited in this respect.

Figure 1:
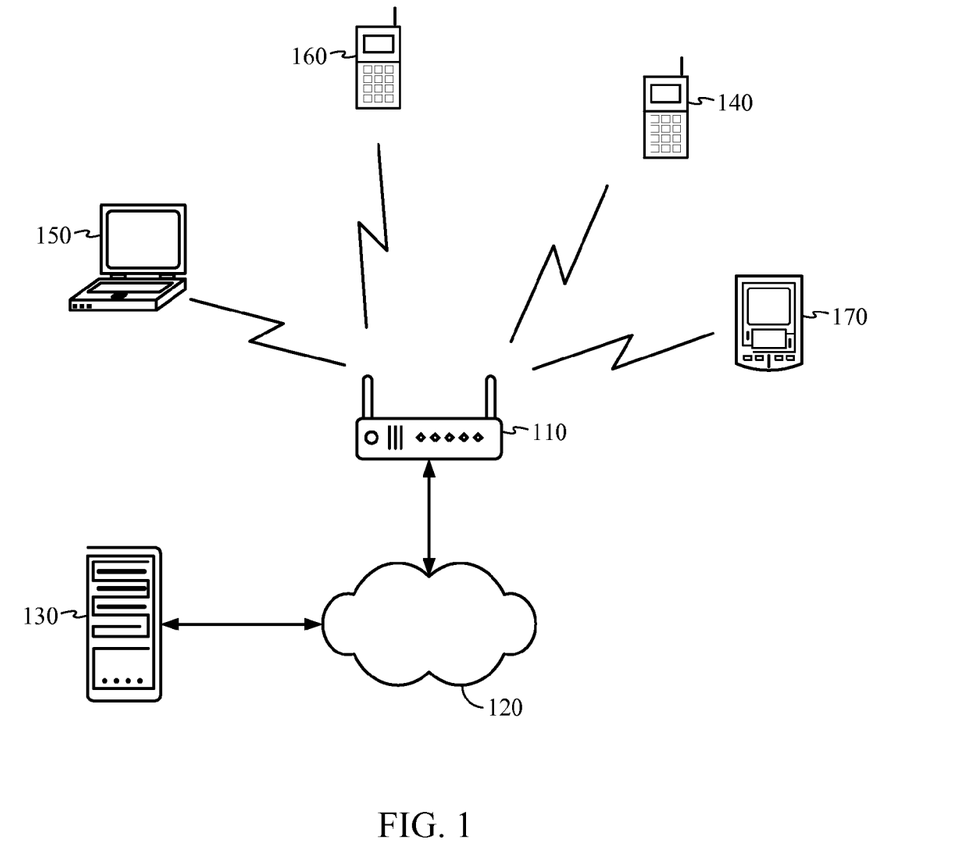
FIG. 1 is a schematic block diagram of an example network system including a number of wireless terminals coupled to a wired network via an access point.

FIG. 1 is a schematic block diagram of a wireless access point 110 in communication with a number of wireless terminals, including cellular telephones 140 and 160, notebook computer 150, and personal digital assistant 170. Access point 110 in this example provides access to network 120 for the wireless terminals. Network 120 for this example is coupled to a server 130 that may comprise merely one of many computing platforms coupled to the network, in some implementations. In an aspect, network 120 may comprise the Internet, although the scope of claimed subject matter is not limited in this respect.

As used herein, the term "access point" refers to any device with the ability to receive wireless signals from one or more terminal devices and that may provide access to a network such as a local area network (LAN) or the Internet, for example. An access point may be installed at a fixed terrestrial location, and may facilitate communication in a wireless communication network, such as, for example, a wireless local area network (WLAN). Such a WLAN may comprise a network compliant to or compatible with an IEEE 802.11x standard, although the scope of claimed subject matter is not limited in this respect. Also, in an aspect, an access point may couple a WLAN to the Internet, in an example implementation. In such an implementation, a wireless terminal may gain access to a server located on the Internet by communicating with the access point using protocols compatible with an 802.11x standard. In another aspect, an access point may comprise a femtocell utilized to extend cellular telephone service into a business or home. In such an implementation, one or more wireless terminals may communicate with the femtocell via a code division multiple access (CDMA) cellular communication protocol, for example, and the femtocell would provide the wireless terminals access to a larger cellular telecommunication network by way of another broadband network such as the Internet. Of course, these are merely example implementations utilizing one or more wireless terminals and an access point, and the scope of claimed subject matter is not limited in this respect.

Also, as used herein, the term "wireless terminal" refers to any device that may communicate with other devices via wireless signals. Such devices may comprise mobile devices such as cellular telephones or notebook computers, for example, or may also comprise relatively stationary devices such as desktop computers, to name another example. Such wireless terminals may communicate via any of a range of wireless communication protocols, examples of which are described below.

Further, as used herein, the term "mobile station" (MS) refers to a wireless communication device that may from time to time have a position location that changes. The changes in position location may comprise changes to direction, distance, orientation, etc., as a few examples. In particular examples, a mobile station may comprise a cellular telephone, user equipment, laptop computer, personal communication system (PCS) device, personal digital assistant (PDA), personal audio device (PAD), portable navigational device, and/or other portable communication devices. A mobile station may also comprise a processing unit and/or computing platform adapted to perform functions controlled by machine-readable instructions. Similarly, other types of wireless terminals may also comprise a processing unit and/or computing platform to perform functions controlled by machine-readable instructions. Further, it should be noted that a mobile station comprises one example type of wireless terminal. However, not all wireless terminals comprise mobile stations.

Wireless communication networks that may be utilized in example implementations described herein may comprise one or more of a wireless wide area network (WWAN), a wireless local area network (WLAN), a wireless personal area network (WPAN), and so on. The term "network" and "system" may be used interchangeably herein. In an aspect, one example WWAN may comprise a Code Division Multiple Access (CDMA) network, and may be utilized in cellular telephone communications. Also, as previously alluded to, one example WLAN may comprise a network implemented to be compliant and/or compatible with an IEEE 802.11x standard. One example WPAN may comprise a Bluetooth network, in an aspect. However, these are merely example wireless network types, and the scope of claimed subject matter is not limited in these respects. Example wireless communication network types are discussed more fully below.

As mentioned previously, beacon signals transmitted from a wireless access point, such as access point 110 depicted in FIG. 1, may be utilized to transmit messages comprising one or more segments to one or more wireless terminals. The beacon signals may further provide information to receiving wireless terminals that may be utilized by the wireless terminals to reconstruct a complete message from the one or more message segments. As used herein, the term "complete message" relates to the original state of the message prior to being partitioned into segments. Therefore, a message constructed from all of the message segments partitioned from a particular message with the message segments placed in the correct order may be considered to be a complete message.

In an aspect, beacons transmitted from wireless access points may be used to initialize location-based applications involving the wireless terminals and a server on a network such as the Internet. For example, a beacon signal may provide a uniform resource identifier (URI) capable of directing a wireless terminal to a server on a network. Responsive to action via access through the URI, the server may launch an application and/or may provide information related to an area located in the vicinity of the access point to the wireless terminal. For example, the server may provide a digital map of the area to the wireless terminal. In an example, an access point may transmit portions of map tile data for a local area around its location using message segments. A map tile may comprise a data construct similar to what some Internet-based mapping services utilize to display maps, wherein global mapping information may be partitioned and displayed according to an area specified by a user. In this manner, data for the local area around the access point that may have rich, dynamic information that may not be globally indexed quickly may be delivered using one or more beacon messages. For another example, location-specific advertisements may be delivered to the wireless terminal. However, these are merely examples of information that may be delivered to a wireless terminal at least in part in response to the wireless terminal accessing a server identified by a URI transmitted as a partitioned message to the wireless terminal using beacon signals from the wireless access point. Additionally, implementations in accordance with claimed subject matter may provide a capability to beacon relatively large messages without requiring a wireless terminal to talk to, for example, a DHCP server to obtain network access, in the case of an implementation involving the Internet. Further, implementations in accordance with claimed subject matter may provide for the beaconing of relatively large messages without requiring changes to software, firmware and/or drivers for the wireless terminals and access points.

Figure 2:
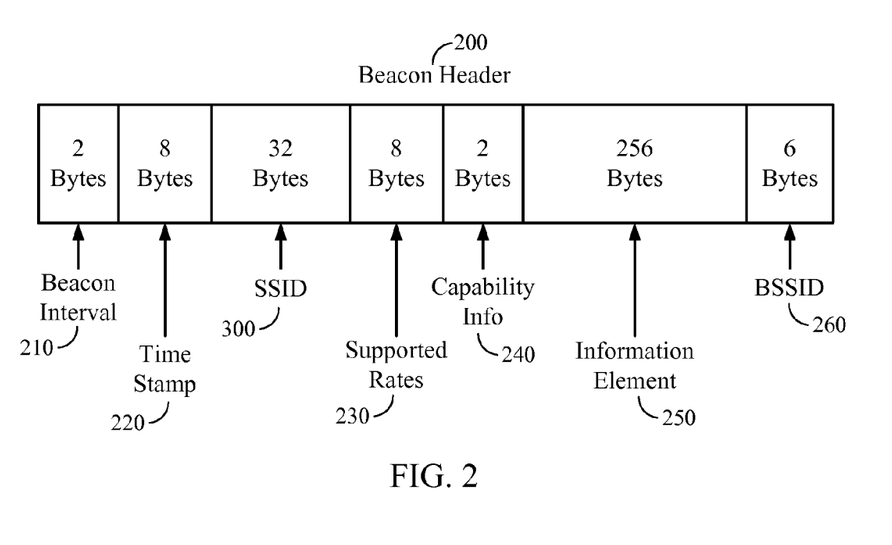
FIG. 2 is a diagram depicting an example format for a beacon signal header.

FIG. 2 is a diagram depicting an example format for a beacon signal header 200. Such a header may comprise a portion of a beacon signal frame transmitted from access point 110 to wireless terminals 140-170, for example. As may be seen in FIG. 2, beacon header 200 for this example implementation comprises a 2-byte beacon interval field 210, an 8-byte time stamp field 220, an 8 byte supported transfer rates field 230, a 2-byte capability information field 240, and a 256-byte information element field 250. Further, beacon header 200 for this example comprises a 32-byte service set identifier (SSID) field 300 and a 6-byte basic service set identifier (BSSID) field 260.

In an aspect, an SSID generally serves as a pubic name for a particular WLAN implemented to be compatible with an 802.11x standard. In another aspect, a wireless access point such as access point 110 may support more than one SSID. The multiple SSIDs may be used to set up virtual WLANs, for example, allowing one access point to facilitate communications for a number of wireless networks. For example, for access point 110, a total of sixteen SSIDs may be supported, although the scope of claimed subject matter is not limited in this respect. It should be understood that beacon signal header 200 is merely a particular example implementation and that other formats, in accordance with different standards or protocols, for example, may be used without deviating from claimed subject matter.

As previously mentioned, a wireless access point may alert wireless terminals within range of the access point of the access point's existence by way of a beacon signal. As seen in FIG. 2, a beacon signal comprises a single SSID field, so for access points that support multiple virtual WLANs and therefore multiple SSIDs, a series of beacon signals may be transmitted, with the individual beacons containing unique SSIDs. The series of beacon signals may be repeated periodically, in an aspect. Although access point 110 may be capable of supporting sixteen unique SSIDs for this example, in general the access point may utilize fewer than the total possible SSIDs, and therefore fewer than the total possible virtual networks, for the purposes of data connectivity and security isolation because the access point would rarely, if ever, be configured to implement a full complement of sixteen virtual WLANs. Because fewer than the total possible SSIDs are used for identifying networks, the remainder may be utilized for messaging. It should be noted again that although the examples disclosed herein are described as being implemented in networking environments compatible with one or more IEEE 802.11x standards, the scope of claimed subject matter is not limited in this respect.

Although the current example describes access point 110 as supporting 16 SSIDs, the scope of claimed subject matter is not limited in this respect. For example, a wireless access point may support 32 SSIDs, or some other number of SSIDs. For the present example, individual SSIDs comprise 32 bytes, or characters. In an aspect, for at least some example implementations, individual SSIDs may support the creation of a specific BSSID. For the example header 200 of FIG. 2, BSSID field 260 is 48 bits in length. In general, the BSSID field may contain a media access control (MAC) address of the access point, but as will be shown below, BSSID field 260 may be utilized in one or more example messaging schemes described herein.

In a situation where multiple wireless transmitters/receivers (together forming multiple radios) exist on a single access point, the individual radios may be operated on individual SSIDs. However, even in such a situation it may be possible to utilize any remaining SSIDs for messaging.

In an aspect, SSIDs used for beaconing relatively large messages may signal receiving devices/clients to not associate themselves with these SSIDs because, e.g., these SSIDs are not used to associate clients with networks supported by a wireless access point. In an aspect, this information may be signaled to a receiving wireless terminal through the use of a pre-selected prefix. At least in part in response to recognizing that the incoming SSID field contains the pre-selected prefix, the wireless terminal may understand that the SSID includes at least a portion of a message, and that the wireless terminal should ignore the SSID value as far as networking associations are concerned. In an aspect, a prefix field may be followed by a message identifier field, a message length field, where the message length may be indicated as a number of beacons, and a sequence number for the information contained in the current SSID beacon.

Figure 3:
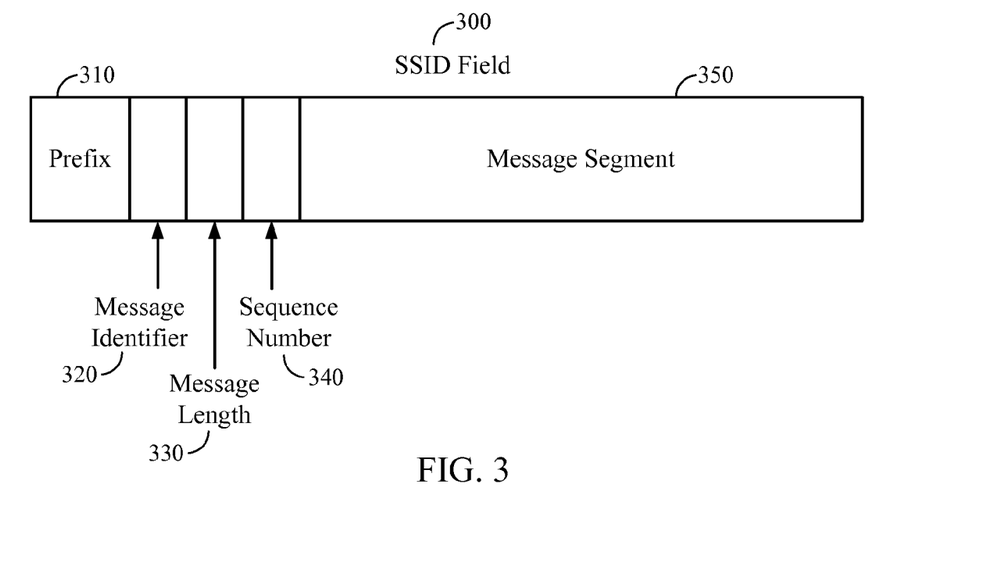
FIG. 3 is a diagram illustrating an example format for a field of a beacon signal header containing a message segment.

FIG. 3 is a diagram illustrating an example format for SSID field 300 of beacon signal header 200, wherein a value indicated by SSID 300 contains a message segment. For the present example, SSID field 300 may comprise a prefix field 310, a message identifier field 320, a message length field 330, and a sequence number field 340, followed by a message segment field 350. Of course, this is merely an example SSID field configuration, and the scope of claimed subject matter is not limited in this respect. Collectively, prefix 310, identifier 320, length 330, and sequence number 340 may be referred to as message metadata. Such metadata may be utilized by a receiving wireless terminal to construct a complete message from the one or more message segments received from the beacon signals transmitted by the access point.

In another aspect, the metadata described above may be carried in BSSID field 260, and the actual message data may be carried in the SSID field for one or more alternative example implementations. In a further example implementation, the BSSID field may be utilized to carry the metadata and the message data. However, the smaller size of the BSSID field for the present example may restrict the message size as compared to implementations that use the SSID field to carry the message data.

Figure 4:
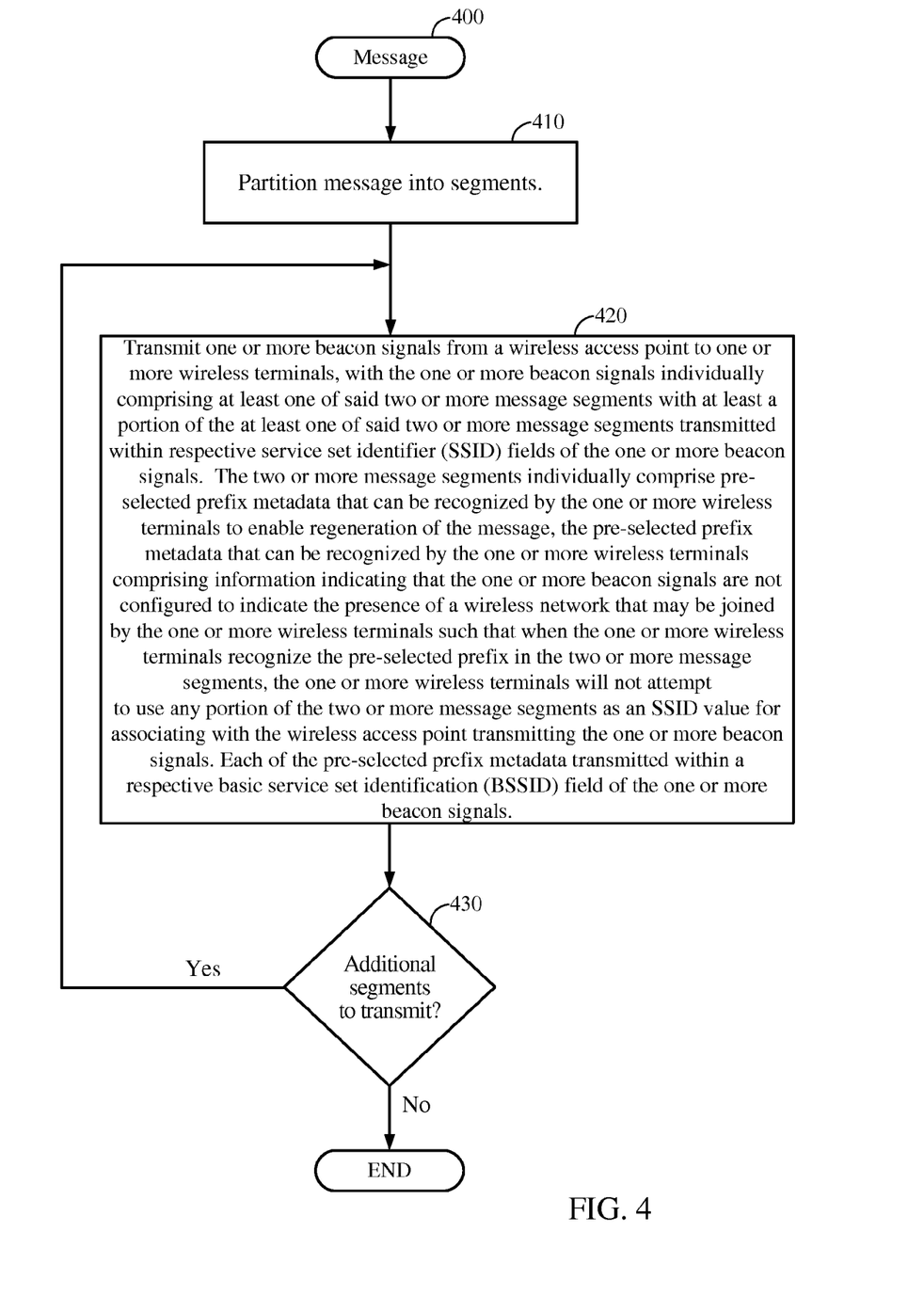
FIG. 4 is a flow diagram depicting an example process for broadcasting variable length messages using beacon signals.

FIG. 4 is a flow diagram depicting an example process for broadcasting variable and/or arbitrary length messages using one or more beacon signals. At block 410, a message 400 may be partitioned into one or more segments, depending on the size of original message. At block 420, a beacon signal may be transmitted from an access point to one or more wireless terminals. The beacon signal may comprise a message segment comprising metadata (e.g., prefix metadata) indicating that the beacon signal is not purposed for network association. As used herein, the term "not purposed for network association" as it relates to a beacon signal is meant to denote that the beacon signal is not configured to indicate the presence of a wireless network that may be joined by one or more wireless terminals. As described above, a receiving wireless terminal may recognize the metadata indicating that the beacon signal is not for network association, and will not attempt to associate itself with the beacon's SSID. The message segment may also include metadata indicating a total number of message segments, or beacons, and further may include a current sequence number associated with the current message segment.

At block 430, a determination may be made as to whether additional segments remain to be transmitted from the access point. If no additional segments exist, the process ends. However, if additional segments remain to be transmitted, the process returns to block 420 where the next segment is transmitted in another beacon signal. Of course, the process depicted in FIG. 4 is merely an example. Implementations in accordance with claimed subject matter may include all of, fewer than, or more than blocks 410-430. Further, the order of blocks 410-430 is merely an example order.

At a receiving wireless terminal, a message may be reconstructed by concatenating message segments corresponding to a given message identifier by collecting all sequence numbers between zero and the message length−1, or between 1 and the message length, for example. Relatively large messages may be broadcast from an access point with a restriction for this example implementation that the combined size of all message segments fits within the available beacons. Messages may be split across multiple simultaneously advertised SSIDs, BSSIDs or a combination of the two.

Figure 5:
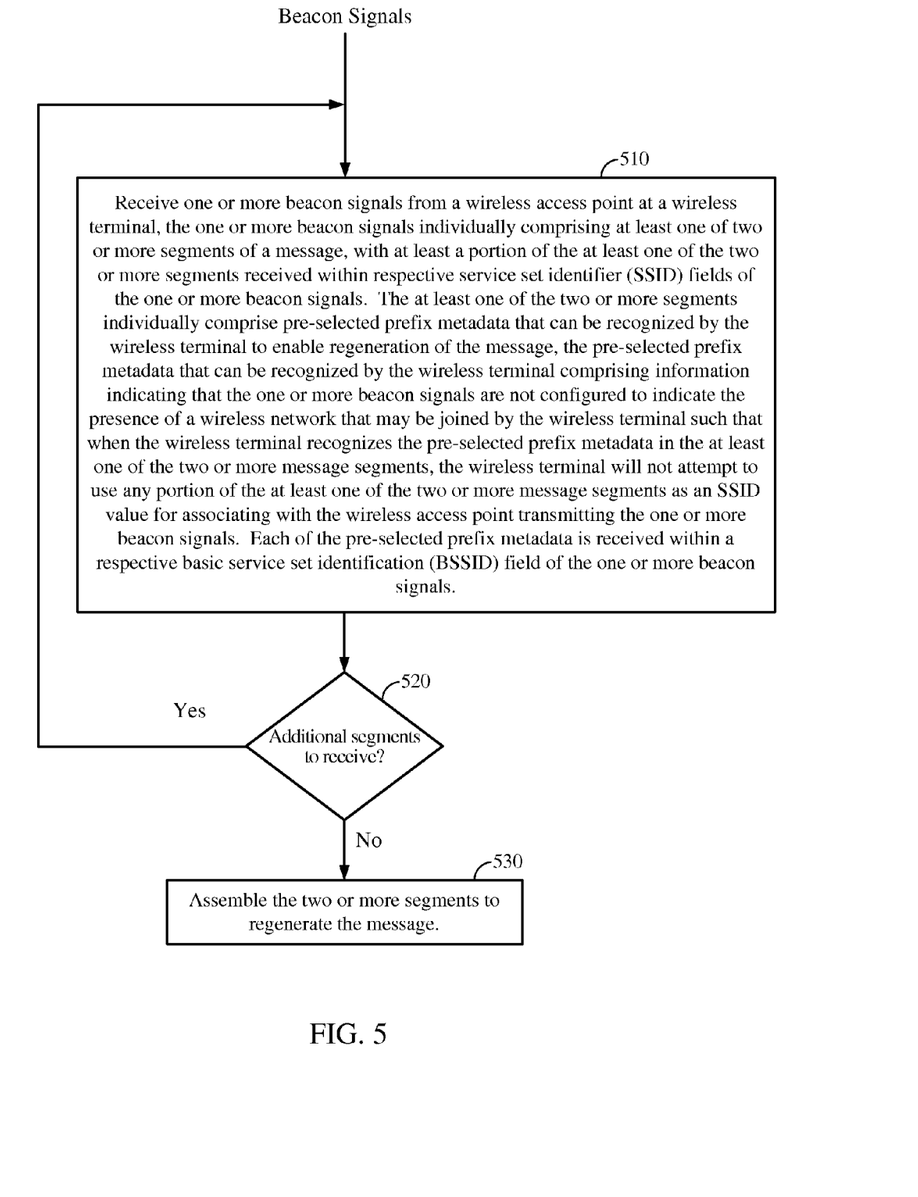
FIG. 5 is a flow diagram depicting an example process for receiving and processing variable length messages received via beacon signals.

FIG. 5 is a flow diagram depicting an example process for receiving and processing variable length messages received via beacon signals. For the present example, the incoming beacon signals represent those signals transmitted from the access point in the example depicted in FIG. 4. For the present example, at block 510 a beacon signal may be received from an access point at a wireless terminal. The beacon signal may include a message segment comprising metadata indicating that the beacon signal is not purposed for network association, and the message segment may further include additional metadata indicating the total number of message segments and a current sequence number. At block 520, a determination may be made as to whether all of the message segments have been received. For an example implementation, this may be determined by examining the message length metadata and comparing it with the number of received message segments corresponding to the appropriate message identifier.

If there remains additional message segments to receive, the example process of FIG. 5 returns to block 510. However, at least in part in response to receiving all of the message segments corresponding to a particular message identifier (no additional messages to receive), the complete message may be reconstructed from the received segments at block 530. Of course, the process depicted in FIG. 5 is merely an example process. Implementations in accordance with claimed subject matter may include all of, fewer than, or more than blocks 510-530. Further, the order of blocks 510-530 is merely an example order.

For the example that follows, a particular message is discussed. However, note that claimed subject matter is not limited to any particular message, nor is it limited to the specific details described in this example. For the present example, it is assumed that it may be advantageous to send a URI of a server to one or more mobile stations in order to deliver local maps to the mobile stations. For example, consider the URI: http://www.abc.mapserver.com/location_handler/ . . . /cgi-bin/handler.cgi The URI above may be too large to carry in a single beacon signal. However, using the example techniques described herein the URI can be partitioned into two message segments and delivered to the mobile stations in SSID fields of two beacons as follows:

SSID1: [ad121 http://www.abc.mapserver.com/location_handler/....]
SSID2: [ad122 /cgi-bin/handler.cgi]

For this example, the pre-selected prefix for the message segments is "ad" which for this example indicates a special SSID advertisement. Also for this example, the message metadata following the prefix may be used to re-assemble the partitioned message from the two beacon signals. For this example, the SSID field is configured in the same manner as described previously in connection with FIG. 3. As can be seen by looking at the message segments above, the message identifier for this example is denoted by the integer "1", the message length is two beacons as indicated by the integer "2", and the $3^{rd}$ character is used to identify the sequence number of the large message. Thus, the first-listed message segment shows that it is a special SSID advertised, that the segment belongs to a message with an identifier integer value of "1", that the message length is two message segments as indicated by the integer value "2", and that the first-listed message segment is the first segment in the sequence of segments as indicated by the integer value "1". The second-listed message segment contains the same metadata with the exception of the sequence identifier, which identifies the second-listed message segment as the second of the sequence as indicated by the integer value "2".

Thus, using the metadata information, a receiving device needs only to recognize that the beacon signals carrying the two message segments listed above contain special advertisement segments, and that there are two such segments with an identifier of 1. At least in part in response to the receiving device receiving a total of two message segments with an identifier of 1, the receiving device can inspect the sequence numbers of the two message segments to know how to concatenate the messages to regenerate the original message, which in this case is a URI.

In a further aspect, the first sequenced beacon signal may include information related to the message being transmitted using a pre-selected description field following the prefix. Given this information, a receiving wireless terminal may choose whether it wants to retrieve the entire message using the remaining SSIDs.

In an additional aspect, for another example, a single beacon signal may contain multiple SSID fields in some implementations. The techniques described above work in the same manner with the exception that the BSSID field is not utilized for storing metadata, as was described above for an alternative implementation. Rather, the metadata for this example is stored in the individual message segments carried in the individual SSID fields. In this case where multiple SSIDs are sent in a single beacon signal, the receiving wireless terminal may still need to inspect multiple beacons with multiple SSIDs to reconstruct a large message. The main difference between the multiple SSID field case and the single SSID field case is that a receiving wireless terminal inspects a beacon signal and extracts all of the message segments contained in the SSID fields. The receiving device may continue to concatenate message segments until they are completely received via one or more such beacons and the original message has been re-assembled. These example techniques may be used to transmit messages up to approximately 992 characters without any changes to currently deployed software, firmware, and drivers for wireless access points or wireless terminals. Of course, the specific implementations described herein are merely examples, and other example implementations may have maximum message sizes that differ from the 992 characters previously mentioned.

Figure 6:
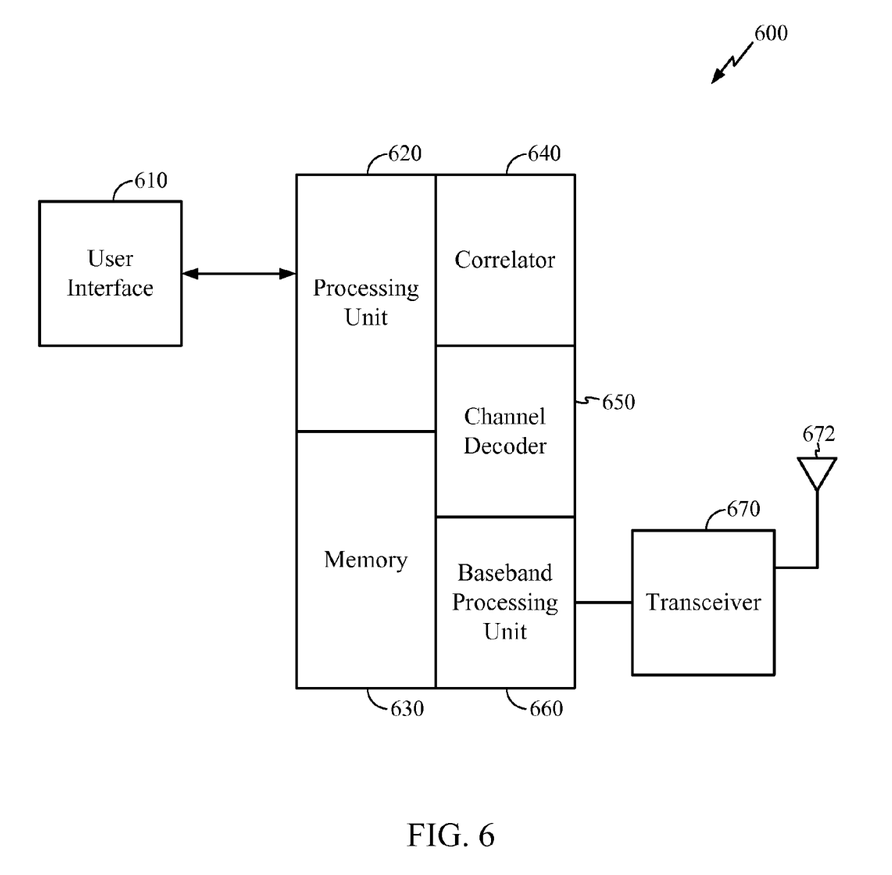
FIG. 6 is a schematic block diagram depicting an example mobile station.

FIG. 6 is a block diagram illustrating an example mobile station 600 that may be adapted to perform any of the example techniques described herein related to wireless terminals. One or more radio transceivers 670 may be adapted to modulate an RF carrier signal with baseband information, such as voice or data, onto an RF carrier, and demodulate a modulated RF carrier to obtain such baseband information. Transceiver 670 may comprise, for example, a receiver circuit and a transmitter circuit, and the receiver circuit may receive one or more beacon signals from, e.g., a wireless access point. An antenna 672 may be adapted to transmit a modulated RF carrier over a wireless communications link and receive a modulated RF carrier over a wireless communications link.

A baseband processing unit 660 may be adapted to provide baseband information from a processing unit (PU) 620 to transceiver 670 for transmission over a wireless communications link. Here, PU 620 may obtain such baseband information from an input device within a user interface 610. Baseband processing unit 660 may also be adapted to provide baseband information from transceiver 670 to PU 620 for transmission through an output device within user interface 610.

User interface 610 may comprise a plurality of devices for inputting or outputting user information such as voice or data.

Such devices may include, by way of non-limiting examples, a keyboard/keypad, a display screen/touch screen, a microphone, and a speaker.

Transceiver 670 may provide demodulated information to correlator 640. Correlator 640 may be adapted to derive beacon-related correlation functions from information relating to beacon signals provided by transceiver 670. This information may be used by mobile station 600 to acquire wireless communications services, for example from a wireless access point such as access point 110. Channel decoder 650 may be adapted to decode channel symbols received from baseband processing unit 660 into underlying source bits. In one example where channel symbols comprise convolutionally encoded symbols, such a channel decoder may comprise a Viterbi decoder. In a second example, where channel symbols comprise serial or parallel concatenations of convolutional codes, channel decoder 650 may comprise a turbo decoder.

A memory 630 may be adapted to store machine-readable instructions which are executable to perform one or more of processes, implementations, or examples which are described or suggested herein. PU 620 may be adapted to access and execute such machine-readable instructions, thereby enabling mobile station 600 to perform one or more of the processes, implementations, and/or examples described and/or suggested herein. Of course, mobile station 600 is merely an example, and the scope of claimed subject matter is not limited to the specific configuration of components and/or functional units depicted.

Figure 7:
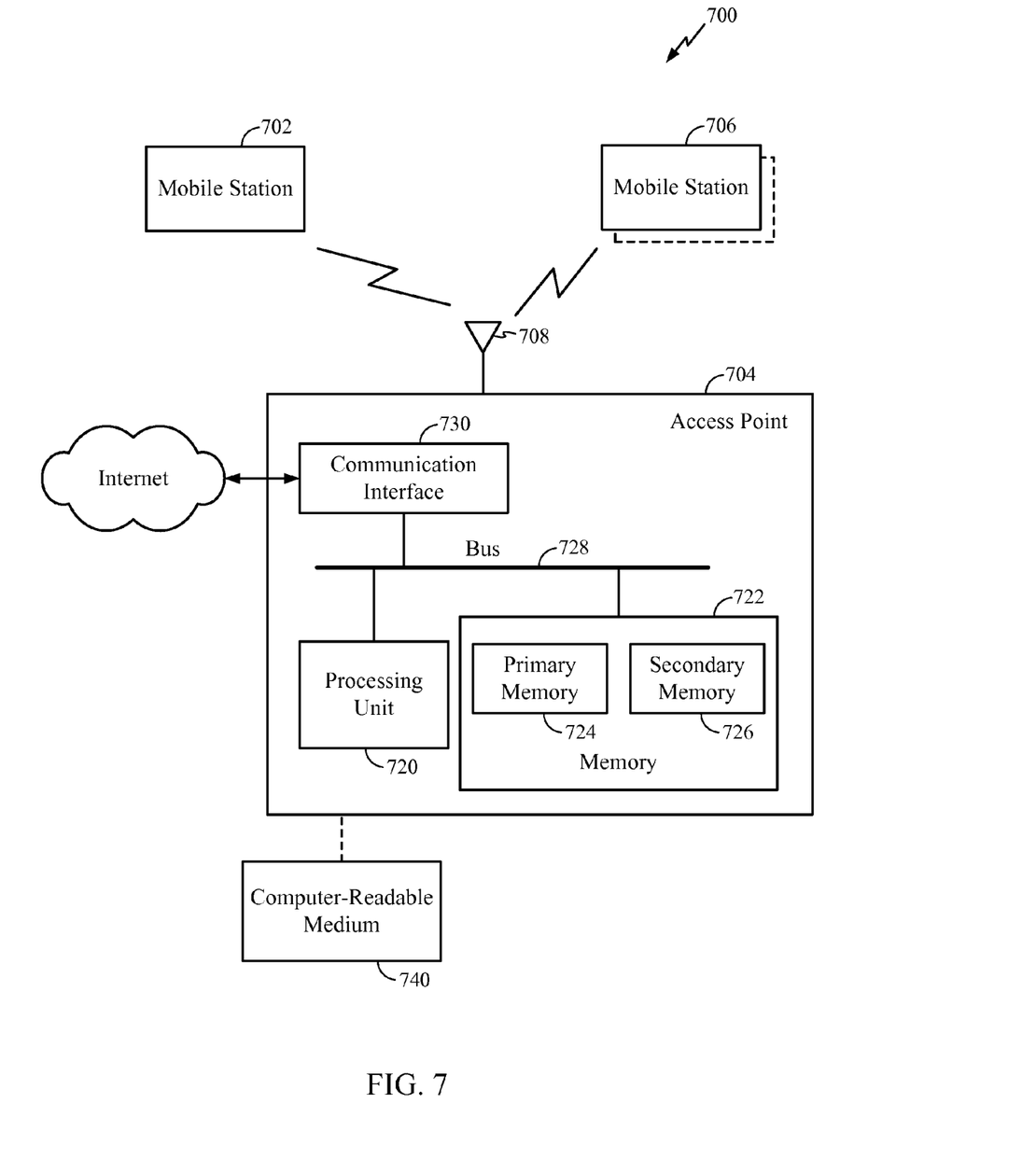
FIG. 7 is a schematic block diagram depicting an example wireless access point.

FIG. 7 is a schematic diagram illustrating a system that may include one or more devices adapted or adaptable to implement techniques and/or processes described herein, for example, in connection with example techniques for using one or more beacon signals to transmit relatively large messages to one or more wireless terminals depicted in FIGS. 1-6. System 700 may include, for example, a mobile station 702, an access point 704, and a mobile station 706. Mobile stations 702 and 706 may communicate with access point 704 via antenna 708 of access point 704.

Although devices 702 and 706 are depicted as mobile stations, these are merely examples of wireless terminals that may be representative of any device, appliance or machine that may be configurable to exchange data over a wireless communications network. By way of example but not limitation, access point 704 may comprise a stand-alone device including one or more radios, or access point 704 may be implemented as at least a portion of one or more computing devices and/or platforms, such as, e.g., a desktop computer, a laptop computer, a workstation, a server device, or the like, although the scope of claimed subject matter is not limited in this respect. Mobile stations 702 and/or 706 may comprise one or more personal computing or communication devices or appliances, such as, e.g., a personal digital assistant, mobile communication device, or the like.

Similarly, the wireless communications depicted between access point 704 and mobile stations 702 and 706, as shown in FIG. 7, is representative of any communication links, processes, and/or resources configurable to support the wireless exchange of data between access point 704 and one or more of mobile stations 702 and 706. As illustrated, for example, by the dashed lined box illustrated as being partially obscured by mobile station 706, there may be additional like devices establishing wireless communications with access point 704.

It is recognized that all or part of the various devices and networks shown in FIGS. 6 and 7, and the processes and techniques as further described herein, may be implemented using or otherwise including hardware, firmware, software, or any combination thereof.

Thus, by way of example but not limitation, access point 704 may include at least one processing unit 720 that is operatively coupled to a memory 722 through a bus 728.

Processing unit 720 is representative of one or more circuits configurable to perform at least a portion of a data computing procedure or process. By way of example but not limitation, processing unit 720 may include one or more processors, controllers, microprocessors, microcontrollers, application specific integrated circuits (ASICs), digital signal processors, programmable logic devices, field programmable gate arrays, and the like, or any combination thereof.

Memory 722 is representative of any data storage mechanism. Memory 722 may include, for example, a primary memory 724 and/or a secondary memory 726. Primary memory 724 may include, for example, a random access memory, read only memory, etc. While illustrated in this example as being separate from processing unit 720, it should be understood that all or part of primary memory 724 may be provided within or otherwise co-located/coupled with processing unit 720.

Secondary memory 726 may include, for example, the same or similar type of memory as primary memory 724 and/or one or more data storage devices or systems, such as, for example, a disk drive, an optical disc drive, a tape drive, a solid state memory drive, a flash memory, etc. In certain implementations, secondary memory 726 may be operatively receptive of, or otherwise configurable to couple to, a computer-readable medium 740. Computer-readable medium 740 may include, for example, any medium that can carry and/or make accessible data, code and/or instructions for one or more of the devices in system 700. Computer readable medium 740 may also be referred to as a storage medium.

Access point 704 may further include, for example, a communication interface 730 that provides for or otherwise supports wireless communication with one or more wireless terminals such as mobile stations 702 and 706. Communication interface 730 may further support communication with a network such as the Internet as depicted in FIG. 7. By way of example but not limitation, communication interface 730 may include a network interface device or card, a modem, a router, a switch, a transceiver, a process, and/or the like.

As used herein, a mobile station (MS) refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

The methodologies described herein may be implemented by various means depending upon applications according to particular examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices designed to perform the functions described herein, and/or combinations thereof.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing unit having a command set which includes the encoded commands. Such an instruction may be encoded in the form of a machine language understood by the processing unit. Again, these are merely examples of an instruction and claimed subject matter is not limited in this respect.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processing unit. Memory may be implemented within the processing unit or external to the processing unit. As referred to herein the term "memory" refers to any type of long term, short term, volatile, nonvolatile, or other memory and is not to be limited to any particular type of memory or number of memories, or type of media upon which memory is stored. "Storage medium" as referred to herein relates to media capable of maintaining expressions which are perceivable by one or more machines. For example, a storage medium may comprise one or more storage devices for storing machine-readable instructions and/or information. Such storage devices may comprise any one of a number of media types including, for example, magnetic, optical or semiconductor storage media. Such storage devices may also comprise any type of long term, short term, volatile or non-volatile memory devices. However, these are merely examples of a storage medium, and claimed subject matter is not limited in these respects.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. A computer-readable medium/storage medium may take the form of an article of manufacture. By way of example, and not limitation, computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processing units to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Some portions of the detailed description included herein are presented in terms of algorithms or symbolic representations of operations on binary digital signals stored within a memory of a specific apparatus or special purpose computing device or platform. In the context of this particular specification, the terms specific apparatus, special purpose computer, special purpose electronic computing device, or the like includes, for example, a general purpose computer/processing unit once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network, or any combination of the above networks, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may comprise an IEEE 802.11x network, and a WPAN may comprise a Bluetooth network, an IEEE 802.15x, for example. Wireless communication implementations described herein may also be used in connection with any combination of WWAN, WLAN and/or WPAN.

The terms, "and," "and/or," and "or" as used herein may include a variety of meanings that will depend at least in part upon the context in which they are used. Typically, "and/or" as well as "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

The invention claimed is:

1. A method, comprising:
partitioning a message, to be broadcast from a wireless access point, into two or more message segments; and
transmitting one or more beacon signals from the wireless access point to one or more wireless terminals, wherein said one or more beacon signals individually comprise at least one of said two or more message segments with at least a portion of the at least one of said two or more message segments transmitted within respective service set identifier (SSID) fields of the one or more beacon signals, wherein said two or more message segments individually comprise pre-selected prefix metadata that can be recognized by the one or more wireless terminals to enable regeneration of the message, the pre-selected prefix metadata that can be recognized by the one or more wireless terminals comprising information indicating that the one or more beacon signals are not configured to indicate the presence of a wireless network that may be joined by the one or more wireless terminals such that when the one or more wireless terminals recognize the pre-selected prefix metadata in the two or more message segments, the one or more wireless terminals will not attempt to use any portion of the two or more message segments as an SSID value for associating with the wireless access point transmitting the one or more beacon signals, each of the pre-selected prefix metadata transmitted within a respective basic service set identification (BSSID) field of the one or more beacon signals.

2. The method of claim 1, wherein said one or more beacon signals are individually associated with the respective SSID fields which are not used to associate clients with networks supported by the wireless access point.

3. The method of claim 1, wherein said transmitting said one or more beacon signals from the wireless access point comprises transmitting said one or more beacon signals in a networking environment compatible with one or more IEEE 802.11x standards.

4. The method of claim 1, wherein the at least one of said two or more message segments further comprises prefix metadata indicating at least in part an order for assembling said two or more message segments into said message.

5. The method of claim 4, wherein the at least one of said two or more message segments further comprises prefix metadata indicating a subject matter for the message.

6. The method of claim 1, wherein said message comprises a pointer.

7. The method of claim 6, wherein the pointer comprises a universal resource indicator (URI).

8. The method of claim 1, wherein the at least one of said two or more message segments further comprises prefix metadata indicating a count of total beacon signals to form the message.

9. The method of claim 1, wherein said message comprises at least a portion of map data.

10. A method, comprising:
receiving one or more beacon signals from a wireless access point at a wireless terminal, said one or more beacon signals individually comprising at least one of two or more segments of a message, with at least a portion of the at least one of the two or more segments received within respective service set identifier (SSID) fields of the one or more beacon signals, wherein said at least one of the two or more segments individually comprise pre-selected prefix metadata that can be recognized by the wireless terminal to enable regeneration of the message, the pre-selected prefix metadata that can be recognized by the wireless terminal comprising information indicating that the one or more beacon signals are not configured to indicate the presence of a wireless network that may be joined by the wireless terminal such that when the wireless terminal recognizes the pre-selected prefix metadata in the at least one of the two or more message segments, the wireless terminal will not attempt to use any portion of the at least one of the two or more message segments as an SSID value for associating with the wireless access point transmitting the one or more beacon signals, each of the pre-selected prefix metadata received within a respective basic service set identification (BSSID) field of the one or more beacon signals; and assembling said two or more segments to regenerate the message.

11. The method of claim 10, wherein said one or more beacon signals are individually associated with the respective SSID fields which are not used to associate clients with networks supported by the wireless access point.

12. The method of claim 10, wherein said receiving said one or more beacon signals from the wireless access point comprises receiving said one or more beacon signals in a networking environment compatible with one or more IEEE 802.11x standards.

13. The method of claim 10, wherein the at least one of said two or more segments further comprises prefix metadata indicating at least in part an order for assembling said two or more segments into the message.

14. The method of claim 10, wherein the at least one of said two or more segments further comprises prefix metadata indicating a subject matter for the message.

15. The method of claim 10, wherein said message comprises a pointer.

16. The method of claim 15, wherein the pointer comprises a universal resource indicator (URI).

17. The method of claim 10, wherein the at least one of said two or more segments further comprises prefix metadata indicating a count of total beacon signals to form the message.

18. A mobile station, comprising:
a receiver circuit to receive one or more beacon signals from a wireless access point, said one or more beacon signals individually comprising at least one of two or more segments of a message, with at least a portion of the one more segments received within respective service set identifier (SSID) fields of the one or more beacon signals, wherein said at least one of the two or more segments individually comprise pre-selected prefix metadata that can be recognized by the mobile station to enable regeneration of the message, the pre-selected prefix metadata that can be recognized by the mobile station comprising information indicating that the one or more beacon signals are not configured to indicate the presence of a wireless network that may be joined by the mobile station such that when the mobile station recognizes the pre-selected prefix metadata in the at least one of the two or more message segments, the mobile station will not attempt to use any portion of the at least one of the two or more message segments as an SSID value for associating with the wireless access point transmitting the one or more beacon signals, each of the pre-selected prefix metadata received within a respective basic service set identification (BSSID) field of the one or more beacon signals; and
a processing unit to assemble said two or more segments to regenerate the message.

19. The mobile station of claim 18, wherein said one or more beacon signals are individually associated with the respective SSID fields which are not used to associate clients with networks supported by the wireless access point.

20. The mobile station of claim 18, wherein said receiver circuit configured to receive said one or more beacon signals from the wireless access point is configured to receive said one or more beacon signals in a networking environment compatible with one or more IEEE 802.11x standards.

21. The mobile station of claim 18, wherein the at least one of said two or more segments further comprises prefix metadata indicating at least in part an order for assembling said one or more segments into the message.

22. The mobile station of claim 18, wherein the at least one of said two or more segments further comprises prefix metadata indicating a subject matter for the message.

23. The mobile station of claim 18, wherein said message comprises a pointer.

24. The mobile station of claim 23, wherein the pointer comprises a universal resource indicator (URI).

25. The mobile station of claim 18, wherein the at least one of said two or more segments further comprises prefix metadata indicating a count of total beacon signals to form the message.

26. An article, comprising: a non-transitory storage medium having stored thereon instructions executable by a computing platform to:
partition a message, to be broadcast from the computing platform, into two or more message segments; and
transmit one or more beacon signals from the computing platform to one or more wireless terminals, wherein said one or more beacon signals individually comprise at least one of said two or more message segments with at least a portion of the at least one of said two or more message segments transmitted within respective service set identifier (SSID) fields of the one or more beacon signals, wherein said message segments individually comprise pre-selected prefix metadata that can be recognized by the one or more wireless terminals to enable regeneration of the message, the pre-selected prefix metadata that can be recognized by the one or more wireless terminals comprising information indicating that the one or more beacon signals are not configured to indicate the presence of a wireless network that may be joined by the one or more wireless terminals such that when the one or more wireless terminals recognize the pre-selected prefix metadata in the two or more message segments, the one or more wireless terminals will not attempt to use any portion of the two or more message segments as an SSID value for associating with the computing platform transmitting the one or more beacon signals, each of the pre-selected prefix metadata transmitted within a respective basic service set identification (BSSID) field of the one or more beacon signals.

27. The article of claim 26, wherein said one or more beacon signals are individually associated with the respective SSID fields which are not used to associate clients with networks supported by the computing platform.

28. The article of claim 26, wherein the storage medium has stored thereon further instructions executable by the computing platform to transmit said one or more beacon signals from the computing platform in a networking environment compatible with one or more IEEE 802.11x standards.

29. The article of claim 26, wherein the at least one of said one or more message segments further comprises prefix metadata indicating at least in part an order for assembling said two or more message segments into a complete message.

30. The article of claim 29, wherein said message comprises a pointer.

31. The article of claim 30, wherein the pointer comprises a universal resource indicator (URI).

32. The article of claim 29, wherein the at least one of said two or more message segments further comprises prefix metadata indicating a count of total beacon signals to form a complete message.

33. The article of claim 26, wherein the at least one of said two or more message segments further comprises prefix metadata indicating a subject matter for the message.

34. An article, comprising: a non-transitory storage medium having stored thereon instructions executable by a mobile station to:

receive one or more beacon signals from a wireless access point, said one or more beacon signals individually comprising at least one of two or more segments of a message, with at least a portion of the at least one of the two more segments received within respective service set identifier (SSID) fields of the one or more beacon signals, wherein said at least one of the two or more segments individually comprise pre-selected prefix metadata that can be recognized by the mobile station to enable regeneration of the message, the pre-selected prefix metadata that can be recognized by the mobile station comprising information indicating that the one or more beacon signals are not configured to indicate the presence of a wireless network that may be joined by the mobile station such that when the mobile station recognizes the pre-selected prefix metadata in the at least one of the two or more message segments, the mobile station will not attempt to use any portion of the at least one of the two or more message segments as an SSID value for associating with the wireless access point transmitting the one or more beacon signals, each of the pre-selected prefix metadata received within a respective basic service set identification (BSSID) field of the one or more beacon signals; and assemble said two or more segments to regenerate the message.

35. The article of claim 34, wherein said one or more beacon signals are individually associated with the respective SSID fields which are not used to associate clients with networks supported by the wireless access point.

36. The article of claim 34, wherein the storage medium has stored thereon further instructions executable by the mobile station to receive said one or more beacon signals in a networking environment compatible with one or more IEEE 802.11x standards.

37. The article of claim 34, wherein the at least one of said two or more segments further comprises prefix metadata indicating at least in part an order for assembling said two or more segments into the message.

38. The article of claim 34, wherein the at least one of said two or more segments further comprises prefix metadata indicating a subject matter for the message.

39. The article of claim 34, wherein said message comprises a pointer.

40. The article of claim 39, wherein the pointer comprises a universal resource indicator (URI).

41. The article of claim 39, wherein the at least one of said two or more segments further comprises prefix metadata indicating a count of total beacon signals to form the message.

42. A wireless access point comprising:

a processing unit configured to partition a message, to be broadcast from the wireless access point, into two or more message segments; and a transmitter to transmit one or more beacon signals from the wireless access point to one or more wireless terminals, wherein said one or more beacon signals individually comprise at least one of said two or more message segments with at least a portion of the at least one of said two or more message segments transmitted within respective service set identifier (SSID) fields of the one or more beacon signals, wherein said two or more message segments individually comprise pre-selected prefix metadata that can be recognized by the one or more wireless terminals to enable regeneration of the message, the pre-selected prefix metadata that can be recognized by the one or more wireless terminals comprising information indicating that the one or more beacon signals are not configured to indicate the presence of a wireless network that may be joined by the one or more wireless terminals such that when the one or more wireless terminals recognize the pre-selected prefix metadata in the two or more message segments, the one or more wireless terminals will not attempt to use any portion of the two or more message segments as an SSID value for associating with the wireless access point transmitting the one or more beacon signals, each of the pre-selected prefix metadata transmitted within a respective basic service set identification (BSSID) field of the one or more beacon signals.

43. The wireless access point of claim 42, wherein said one or more beacon signals are individually associated with the respective SSID fields which are not used to associate clients with networks supported by the wireless access point.

44. The wireless access point of claim 42, wherein the at least one of said two or more message segments further comprises prefix metadata indicating at least in part an order for assembling said two or more message segments into said message.

45. An apparatus comprising:

means for partitioning a message, to be broadcast from a wireless access point, into two or more message segments; and means for transmitting one or more beacon signals from the wireless access point to one or more wireless terminals, wherein said one or more beacon signals individually comprise at least one of said two or more message segments with at least a portion of the at least one of said two or more message segments transmitted within respective service set identifier (SSID) fields of the one or more beacon signals, wherein said two or more message segments individually comprise pre-selected prefix metadata that can be recognized by the one or more wireless terminals to enable regeneration of the message, the pre-selected prefix metadata that can be recognized by the one or more wireless terminals comprising information indicating that the one or more beacon signals are not configured to indicate the presence of a wireless network that may be joined by the one or more wireless terminals such that when the one or more wireless terminals recognize the pre-selected prefix metadata in the two or more message segments, the one or more wireless terminals will not attempt to use any portion of the two or more message segments as an SSID value for associating with the wireless access point transmitting the one or more beacon signals, each of the pre-selected prefix metadata transmitted within a respective basic service set identification (BSSID) field of the one or more beacon signals.

46. The apparatus of claim 45, wherein said one or more beacon signals are individually associated with the respective SSID fields which are not used to associate clients with networks supported by the wireless access point.

47. The apparatus of claim 45, wherein the at least one of said two or more message segments further comprises prefix metadata indicating at least in part an order for assembling said two or more message segments into said message.

48. An apparatus comprising:

means for receiving one or more beacon signals from a wireless access point, said one or more beacon signals individually comprising at least one of two or more segments of a message, with at least a portion of the at least one of the two more segments received within respective service set identifier (SSID) fields of the one or more beacon signals, wherein said at least one of the two or more segments individually comprise pre-selected prefix metadata that can be recognized by the apparatus to enable regeneration of the message, the pre-selected prefix metadata that can be recognized by the apparatus comprising information indicating that the one or more beacon signals are not configured to indicate the presence of a wireless network that may be joined by the apparatus such that when the apparatus recognizes the pre-selected prefix metadata in the at least one of the two or more message segments, the apparatus will not attempt to use any portion of the at least one of the two or more message segments as an SSID value for associating with the wireless access point transmitting the one or more beacon signals, each of the pre-selected prefix metadata received within a respective basic service set identification (BSSID) field of the one or more beacon signals; and means for assembling said two or more segments to regenerate the message.

49. The apparatus of claim 48, wherein said one or more beacon signals are individually associated with the respective SSID fields which are not used to associate clients with networks supported by the wireless access point.

50. The apparatus of claim 48, wherein the at least one of said two or more segments further comprises prefix metadata indicating at least in part an order for assembling said one or more segments into the message.

* * * * *